United States Patent
Holladay et al.

(10) Patent No.: US 7,077,643 B2
(45) Date of Patent: Jul. 18, 2006

(54) MICROCOMBUSTORS, MICROREFORMERS, AND METHODS FOR COMBUSTING AND FOR REFORMING FLUIDS

(75) Inventors: Jamelyn D. Holladay, Kennewick, WA (US); Max R. Phelps, Richland, WA (US); Yong Wang, Richland, WA (US); Ya-Huei Chin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 492 days.

(21) Appl. No.: 10/008,363

(22) Filed: Nov. 7, 2001

(65) Prior Publication Data

US 2003/0091502 A1 May 15, 2003

(51) Int. Cl.
*F23D 11/44* (2006.01)

(52) U.S. Cl. .............. 431/215; 431/268; 431/161; 431/170; 431/328; 429/26; 422/211

(58) Field of Classification Search ............ 431/215, 431/207, 161, 268, 170, 328; 429/20, 26, 429/34; 422/177, 211; 165/167; 48/127.9
See application file for complete search history.

(56) References Cited

U.S. PATENT DOCUMENTS

| | | | | |
|---|---|---|---|---|
| 3,498,844 A * | 3/1970 | Sanderson | ........... | 429/13 |
| 4,369,029 A | 1/1983 | Forster | ........... | 432/29 |
| 4,823,867 A | 4/1989 | Pollard | ........... | 165/166 |
| 4,876,162 A | 10/1989 | McElroy | ........... | 429/13 |
| 5,015,444 A | 5/1991 | Koga et al. | ........... | 422/195 |
| 5,180,561 A * | 1/1993 | Morishima et al. | ........... | 422/191 |
| 5,403,184 A | 4/1995 | Hosaka et al. | ........... | 431/170 |
| 5,432,023 A | 7/1995 | Yamada et al. | ........... | 429/34 |
| 5,609,834 A | 3/1997 | Hamada et al. | ........... | 422/196 |
| 5,670,269 A | 9/1997 | Hamada et al. | ........... | 429/20 |
| 5,674,301 A | 10/1997 | Sakai et al. | ........... | 48/61 |
| 5,733,347 A | 3/1998 | Lesieur | ........... | 48/61 |
| 5,811,062 A * | 9/1998 | Wegeng et al. | ........... | 422/129 |
| 5,858,314 A | 1/1999 | Hsu et al. | ........... | 422/211 |
| 5,861,137 A | 1/1999 | Edlund | ........... | 423/652 |
| 5,931,658 A * | 8/1999 | Sederquist et al. | ........... | 431/207 |
| 5,938,800 A | 8/1999 | Verrill et al. | ........... | 48/127.9 |
| 6,001,291 A | 12/1999 | Cesaroni | ........... | 264/134 |
| 6,036,927 A | 3/2000 | Chatterjee et al. | ........... | 422/211 |
| 6,056,932 A | 5/2000 | von Hippel et al. | ........... | 423/376 |

(Continued)

FOREIGN PATENT DOCUMENTS

EP 0308976 A1 3/1989

(Continued)

OTHER PUBLICATIONS

PCT Search Report, mailed Oct. 24, 2003, PCT/US 02/35762.

(Continued)

*Primary Examiner*—Josiah C. Cocks
(74) *Attorney, Agent, or Firm*—Frank Rosenberg

(57) ABSTRACT

The present invention provides microcombustors, microreformers, and methods of steam reforming alcohols over a catalyst. The microcombustors can be manufactured with a very small size and can operate at very low temperature. Surprisingly superior results and properties obtained in methods of the present invention are also described.

47 Claims, 3 Drawing Sheets

U.S. PATENT DOCUMENTS

| | | | |
|---|---|---|---|
| 6,059,024 A | 5/2000 | Ramshaw et al. | 165/166 |
| 6,117,578 A | 9/2000 | Lesieur et al. | 429/19 |
| 6,159,358 A | 12/2000 | Mulvaney, III et al. | 208/46 |
| 6,159,434 A | 12/2000 | Gonjo et al. | 422/191 |
| 6,168,765 B1 | 1/2001 | Romantier | 422/200 |
| 6,180,846 B1 | 1/2001 | Dandekar et al. | 585/443 |
| 6,190,623 B1 | 2/2001 | Sanger et al. | 422/192 |
| 6,192,596 B1 | 2/2001 | Bennett et al. | 34/76 |
| 6,193,501 B1 * | 2/2001 | Masel et al. | 431/170 |
| 6,200,536 B1 * | 3/2001 | Tonkovich et al. | 422/177 |
| 6,203,587 B1 | 3/2001 | Lesieur et al. | 48/61 |
| 6,228,341 B1 | 5/2001 | Hebert | 423/352 |
| 6,241,875 B1 | 6/2001 | Gough | 208/106 |
| 6,277,339 B1 | 8/2001 | Bonberg et al. | 422/198 |
| 6,613,972 B1 * | 9/2003 | Cohen et al. | 136/209 |

FOREIGN PATENT DOCUMENTS

| | | | |
|---|---|---|---|
| EP | 0921584 A3 | 6/1999 | |
| EP | 1 031 375 | 8/2000 | |
| EP | 1031374 A3 | 8/2000 | |
| EP | 1 061 011 | 12/2000 | 23/60 |
| EP | 1087455 A2 | 3/2001 | |
| EP | 1 123 735 | 8/2001 | |
| JP | 2002-61805 A * | 2/2002 | |
| WO | WO 99/00186 * | 1/1999 | |
| WO | WO 00/06295 | 2/2000 | |
| WO | WO 00/79199 | 12/2000 | |
| WO | WO 00/79199 A1 | 12/2000 | |
| WO | WO 00/79206 | 12/2000 | 21/6 |
| WO | WO 01/54804 | 8/2001 | 8/2 |
| WO | WO 01/54805 | 8/2001 | 8/2 |
| WO | WO 01/54806 | 8/2001 | 8/2 |
| WO | WO 02/064248 A3 | 8/2002 | |

OTHER PUBLICATIONS

Schubert et al., "Microstructure Devices For Applications In Thermal And Chemical Process Engineering," Microscale Thermophysical Engineering, 5:17-39, 2001.

PCT International Preliminary Examination Report PCT/US02/35762, mailed Jul. 12, 2005.

Peterson et al., "A Catalytic Combustor for Microscale Applications," CST Communications, vol. 1, pp. 10-13 (2000).

Maruta et al., "Characteristics of Microscale Combustion in a Narrow Heated Channel," Combustion, Explosion and Shock Waves, vol. 40, pp. 516-523 (2004).

Ju et al., "An analysis of sub-limit flame dynamics using opposite propagating flames in mesoscale channels," Combustion and Flame 133, pp. 483-493 (2003).

Charlesworth, R. et al., "*Combustion and Steam Reforming of Methane on Thin Layer Catalysts for Use in Catalytic Plate Reactors.*" p. 85-89. 1995.

Cunha, J. et al., "*Modelling the Integration of a Compact Plate Steam Reformer in a Fuel Cell System.*" p. 515-522. 2000.

Mulder, A. et al., "*Catalytic Combustion in a Sintered Metal Reactor With Integrated Heat Exchanger.*" p. 825-836. 1997.

Polman, EA. et al., "*Novel Compact Steam Reformer for Fuel Cells With Heat Generation by Catalytic Combustion Augmented by Induction Heating.*" p. 347-351. 1999.

Schubert, K. et al., "*Microstructure Devices for Applications in Thermal and Chemical Process Engineering.*" p. 17-39. 2001.

* cited by examiner ary supplies, for example, a power supply for
MICROCOMBUSTORS, MICROREFORMERS, AND METHODS FOR COMBUSTING AND FOR REFORMING FLUIDS This invention was made with Government support under DARPA contract# DABT63-99-C-0039. The Government has certain rights in this invention.

FIELD OF THE INVENTION

The invention relates to combustors and steam reformers, and methods for combusting and steam reforming fuels.

BACKGROUND OF THE INVENTION

The ever-decreasing size of microelectronic devices and the rapid development of microelectromechanical systems (MEMS) have created a great need for high energy density micropower supplies, for example, a power supply for microelectronic devices. Typically, conventional battery technology is used in these applications. However, current battery technology has a very low energy density, on the order of from 0.035 to 0.350 $kW_e$-hr/kg. An alternative to batteries is to combine a small fuel cell with a micro-hydrocarbon fuel processor. In this case, the size of a fuel processor's primary converter, e.g., fuel reformer, must be reduced. It is also desirable to lower the operating temperature of fuel reformer. This is difficult because the combustion and, therefore, the reforming processes are no longer stable. The lower operating temperature favors the more desirable products (hydrogen and carbon dioxide) in the reforming reactions and also makes thermal management and integration easier, especially on this small size scale. However, providing stable heat for the endothermic reforming processes is difficult, due to the fact that stable combustion is generally self-sustaining only at temperatures in excess of 1000° C. The instability of the combustor operation leads to partial vaporization of the hydrocarbon fuel, if it is liquid, and to less than desired conversion of the hydrocarbons to a hydrogen rich product stream due to the intermittent lack of energy for the endothermic reactions. On the other hand, combustion expedited by catalysts, catalytic combustion, can be stable down to lower temperatures of about 200° C.

There remains a need for microcombustors and fuel reformers which have a very small size, steady performance, and operate at low temperature while maintaining high efficiency levels.

SUMMARY OF THE INVENTION

The present invention provides microcombustors and microreformers which can be made with a very small size and which can operate at low temperature. The invention also provides devices utilizing the inventive microcombustors and/or microreformers instead of more conventional devices such as batteries. The invention further provides methods of fuel combustion and steam reforming.

In one aspect of the present invention there is a microcombustor comprising: a first section comprising a combustion fuel channel having an inlet for connecting the microcombustor to a combustion fuel source and an outlet at a top surface of said first section; and a second section disposed next to the first section; the second section including: a combustion chamber having an inlet in fluid communication with the outlet of the channel of the first section and an outlet capable of evacuating combustion exhaust products; and an exhaust channel having an inlet in fluid communication with the outlet of the combustion chamber and an outlet at a surface of said second section; wherein the combustion fuel channel and the exhaust channel are disposed on a same side with respect to the combustion chamber, so as to form a first heat exchanger.

In a second aspect, the invention provides a microcombustor that includes: a gas inlet connected to a reaction chamber; a liquid feed system connected to the inlet of the reaction chamber; a reaction chamber having an internal volume of 100 $mm^3$ or less; an outlet connected to the reaction chamber; and a wick, packed tube or capillary tube disposed in at least one of the inlet or the outlet.

In another aspect, the invention provides a steam reformer, comprising
a microcombustor as described above; and a third section comprising a reformation channel having an inlet for supplying reformation fuel and an outlet for evacuating reformation products, wherein the exhaust channel and at least a portion of the reformation channel are disposed on a same side with respect to the combustion chamber, so as to form a second heat exchanger.

In another aspect, the invention provides a steam reformer, including: a combustion chamber having an inlet and an outlet, a combustion catalyst being disposed in the combustion chamber; and a reformation chamber having an inlet and an outlet, a reformation catalyst being disposed in the reformation chamber, wherein the combustion catalyst and the reformation catalyst are disposed on opposite faces of a separation plate disposed between the combustion chamber and the reformation chamber.

In a further aspect, the invention provides a steam reformer, that includes: a combustion chamber having an inlet and an outlet, a combustion catalyst being disposed in the combustion chamber; and a reformation chamber having an inlet and an outlet, a reformation catalyst being disposed in the reformation chamber, the combustion chamber and the reformation chamber being disposed around an axis, the inlet and outlet of the combustion chamber being in fluid communication with combustion fuel and combustion exhaust channels, respectively, and the inlet and outlet of the reformation chamber being in fluid communication with reformation fuel and reformation products channels, respectively. The combustion fuel channel is disposed along the axis on a side of the combustion chamber opposite the reformation chamber. The reformation fuel channel is disposed along the axis on a side of the reformation chamber opposite the combustion chamber. The reformation products channel is disposed outside the reformation fuel channel with respect to the axis and on the side of the reformation chamber opposite the combustion chamber, and the combustion exhaust channel is disposed outside the reformation fuel channel with respect to the axis and on the side of the reformation chamber opposite the combustion chamber.

In yet another aspect, the invention provides a steam reformer that includes: a combustion chamber having an inlet and an outlet; and a reforming chamber having an inlet and an outlet. The outlet of the combustion chamber surrounds the outlet of the reforming chamber, and the outlet of the reforming chamber surrounds the inlet of the reforming chamber.

In a still further aspect, the invention provides a steam reformer, comprising: a combustion channel comprising a combustion chamber having an inlet and an outlet; and a reforming channel comprising a reforming chamber having an inlet and an outlet. The reforming chamber has two end sides and a peripheral lateral side. The combustion channel surrounds the reforming chamber over at least one of the end sides and the peripheral lateral side.

In another aspect, the invention also provides a steam reformer comprising: a first inlet connected to a first reaction chamber; a second inlet connected to a second reaction chamber; a heat transfer plate having first and second major surfaces, the first major surface being in thermal contact with the first reaction chamber, and the second major surface being in thermal contact with the second reaction chamber. The first reaction chamber comprises a combustion catalyst or a steam reforming catalyst, wherein, if the first reaction chamber comprises a combustion catalyst, the second reaction chamber comprises a steam reforming catalyst; or if the first reaction chamber comprises a steam reforming catalyst, the second reaction chamber comprises a combustion catalyst, and, the first inlet is connected to the first reaction chamber such that, during operation, fluid flows in more than one direction through the first reaction chamber.

In yet another aspect, the invention provides a steam reformer including: a first reaction chamber connected to a first inlet and a first outlet; and a second reaction chamber connected to a second inlet and a second outlet. The first reaction chamber and the second reaction chamber are in thermal communication. The first reaction chamber comprises a combustion catalyst or a steam reforming catalyst, wherein, if the first reaction chamber comprises a combustion catalyst, the second reaction chamber comprises a steam reforming catalyst; or if the first reaction chamber comprises a steam reforming catalyst, the second reaction chamber comprises a combustion catalyst. The first inlet and the first outlet are connected to the first reaction chamber such that, during operation, fluid flows in more than one direction through the first reaction chamber between the first inlet and the first outlet.

In a still further aspect, the invention provides a microcombustion process that includes: providing a composition comprising combustion fuel and oxidant to a combustion chamber, and passing the composition through a combustion catalyst. The combustion catalyst comprises a porous matrix arranged such that sufficient mixture flows through the catalyst to maintain a combustion at a temperature of at most about 500° C. The composition in the combustion chamber is reacted to produce sufficient heat to sustain the microcombustion process without energy input.

In another aspect, the invention provides a steam reforming process that includes: passing a reformation gas through a reforming chamber. The combustion of a combustion fuel in a combustion chamber is maintained so as to transfer heat from the combustion chamber to the reforming chamber. The temperature difference between the combustion chamber and the reforming chamber is at most about 100° C.

In a yet further aspect, the invention provides a method of making hydrogen gas, comprising: passing a composition comprising $H_2O$ and hydrocarbon into a reforming chamber and reacting the $H_2O$ and hydrocarbon in said reforming chamber to form a hydrogen rich gas mixture. A composition comprising fuel and oxidant is passed into a combustion chamber and, simultaneous to the step of reacting $H_2O$ and hydrocarbon, the fuel and oxidant in the combustion chamber are reacted to produce heat. The reforming chamber and the combustion chamber are separated by a thermally conductive layer. Heat is transferred from the combustion chamber to the reforming chamber. The average thermal transport distance from the combustion chamber to the reforming chamber is 1 mm or less. This "thermal transport distance" is measured from the area within a combustion zone where combustion occurs. The above aspect of the invention is typically associated with at least one of the following characteristics: (1) at least 80% of the fuel is oxidized in the combustion chamber and the thermal efficiency of the method is at least 5% ; (2) hydrogen gas production of at least 30 sccm (standard cubic centimeters per minute) $H_2$ per cc of steam reformer volume; or (3) hydrogen gas production of at least 1 sccm $H_2$ per cc of device volume.

In yet another aspect, the invention provides a method of steam reforming that includes: passing a reformation gas through a reforming chamber, maintaining combustion of a combustion fuel in a combustion chamber so as to transfer heat from the combustion chamber to the reforming chamber. The reforming chamber is configured such that the volume of the chamber increases as a function of distance from a reaction chamber inlet; and reformation gas and products expand as they pass through the reforming chamber.

The various inventive aspects can be described in combination with any of the details described in the drawings and the following Descriptions of the Preferred Embodiments section. For example, the inventive methods can be further described by combining with the flow rates described in the Descriptions section. The invention also includes fuel cells that contain any of the combustors and/or reformers described herein. The invention also includes methods of making hydrogen, or methods of combustion or steam reforming that utilize any of the combustors and/or reformers described herein.

Various embodiments of the invention can provide numerous advantages including one or more of the following. First, light-weight and compact energy sources can be obtained. Further, the rapid heat and mass transfer in a device can enable the use of extremely active catalysts, catalyst which are active at low temperature, and catalysts with high throughput per volume. It is also possible to control process conditions, such as operating temperature, very precisely, so that high performance can be attained. The fuel combustion and steam reforming processes can be stably and efficiently operated at lower temperatures, without the need for energy input to sustain or even to start the microcombustion process. In some instances, the microcombustor is started with hydrogen or vapors such as methanol. Heat losses can be effectively controlled and reduced. Another advantage is that the simplicity of the design and the materials used enable mass production at competitive costs.

Further, the microcombustor or microreformer can be part of an efficient integrated system, which can reform lower hydrocarbons and even higher hydrocarbons that require higher processing temperature, such as butane. Carbon dioxide selectivity over carbon monoxide, a poison to fuel cells, of the steam reforming process is high, so that it is possible to avoid or reduce requirements for removing carbon monoxide after reforming and before supplying the gas to the fuel cell, thereby greatly simplifying the overall system and reducing system size. Since catalytic combustion is used, stable low temperature performance is easily attained for the combustor to provide uninterrupted operational heat for vaporizers and steam reformer units so they may operate in a steady optimal manner.

The low temperature operation and manufacturing made possible by the invention allows a greater choice of insulating materials, enables greater use of materials with dissimilar thermal expansion coefficients, and enables manufacture on semiconductor chips. The inventive combustors and reformers can be made from plastic. There are numerous advantages of manufacturing in plastic including low weight and less required insulation.

Another advantage that results from the small size of the invention is better control of heating. Heat loss is a function of surface area—lowering surface area (for the same amount of heat) reduces heat loss and puts thermal energy exactly where it is needed. Another advantage is an extremely fast response time, that is, a change in fluid flow can result in a nearly instantaneous change in temperature.

The subject matter of the present invention is particularly pointed out and distinctly claimed in the concluding portion of this specification. However, both the organization and method of operation, together with further advantages and objects thereof, may be better understood by reference to the following description taken in connection with accompanying drawings wherein like reference characters refer to like elements.

GLOSSARY OF TERMS

"Catalyst" is a solid material that enhances reaction rate.
"Chamber" refers to the area in which a reaction takes place. In the present invention, in embodiments where a catalyst is in the chamber, the area of a chamber includes the catalyst (including pores), the area above, below and to the sides of the catalyst, but not the area to the exhaust side of the catalyst. Illustrative examples are shown in the figures.
For example, in FIG. 4 area 426 is part of the reaction chamber while 428 is not.
"Channels" refers to the generally accepted meaning and includes conduits and other means for directing the flow of a fluid. Channels of the invention include at least one opening, typically with an inlet and outlet, and may include other openings. As will be seen in the description below of various embodiments, numerous functions other than simple mass transport can occur within channels.
"Fluid communication" between two areas means that a fluid can flow from one area to the other. "Thermal communication" between two areas means that heat can flow from one area to the other.
That "fluid flows in more than one direction" means that there is more than one fluid flow path. For example, in a straight or curved pipe there is only one fluid flow path (fluid flows in only one direction); while in a pipe with a T-joint, there are two flow paths (fluid flows in two directions). An example of fluid flowing in more than one direction is shown in combustion chamber 402 of FIG. 4.
"Heat exchanger" is a device or component designed such that heat can be transferred from one fluid to another.
"Layer" refers to a defined area comprising certain listed elements. Typically layers are stacked in multiple-layer configurations. Preferably, layers are planar or substantially planar meaning that projections from a layer make up less than 20% of the area of the layer. A "section" is a layer or portion of a layer.
"Micro," such as in microcombustor, refers to devices in which there is at least one dimension of a channel or chamber that is 1 mm or less.
"Peripheral lateral side" means a portion of a volume which surrounds a central portion of the volume and is lateral with respect to a main axis or line of the volume.
"Separator plate" is a solid structural component (e.g., a wall) that separates one channel from another channel.
"Volume" of a combustor, combustion chamber, reformer chamber or reformer, unless otherwise indicated, refers to the internal volume where reaction substantially occurs but not adjacent material. For example, in FIG. 1 the volume of the combustion chamber is the volume of cavity 118 (including catalyst 124), in FIG. 3 the volume of the combustion chamber is the volume of catalyst 316, and in FIG. 4 the volume of the catalyst 416. Where a catalyst is present, the volume includes at least the catalyst volume and catalyst void fraction. Volume of a device, unless otherwise indicated, refers to the combustor and reformer volume and the volume of any intervening and integral components such as heat exchangers, preheaters, vaporization chambers, recuperators, etc. In FIGS. 1–4 the volume of the device is the volume of the main body of the rectangular block or largest cylinders, but not the inlet and outlet tubes that stick out of the main body.
"Wick" is a material that transports liquid, usually the driving forces for transport through the wick are capillary forces or a pressure gradient, but other mechanisms such as a graded material with differing degrees of hydrophilicity could be employed.

DESCRIPTION OF PREFERRED EMBODIMENTS

FIGS. 1–4 show three embodiments of the inventive devices. These embodiments are not intended to limit the scope of the invention.

Figure 1:
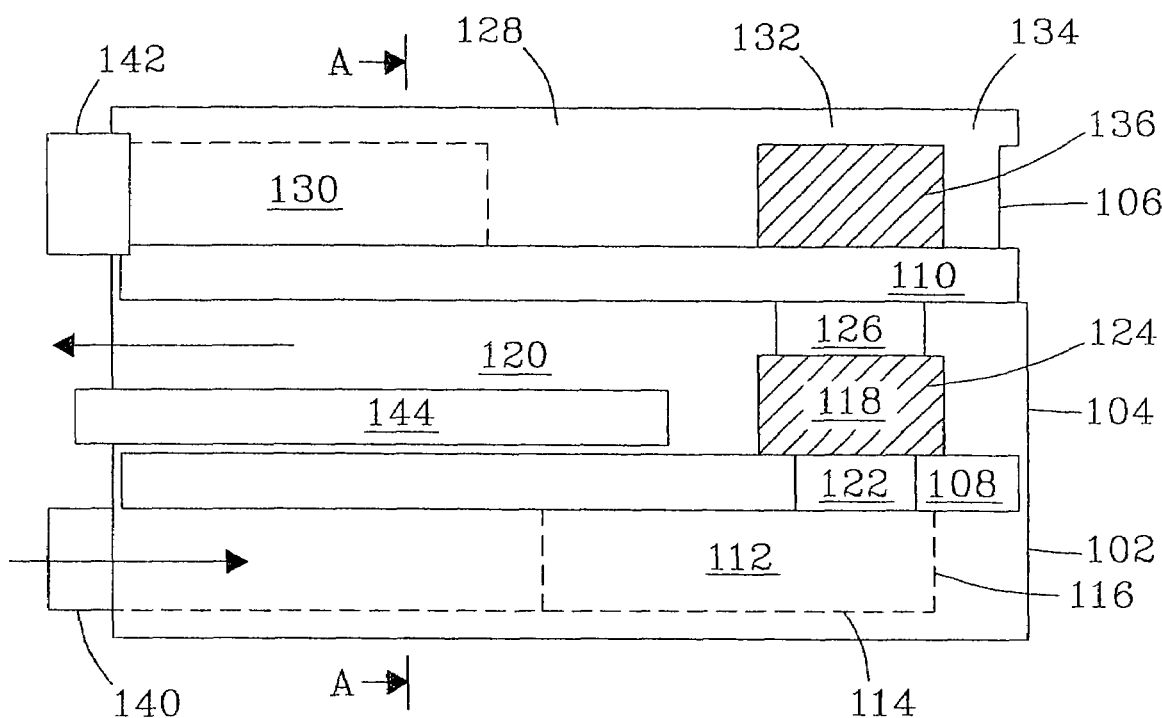
FIG. 1 is a cross-sectional side view of a microreformer in a first embodiment according to the present invention.
Figure 2:
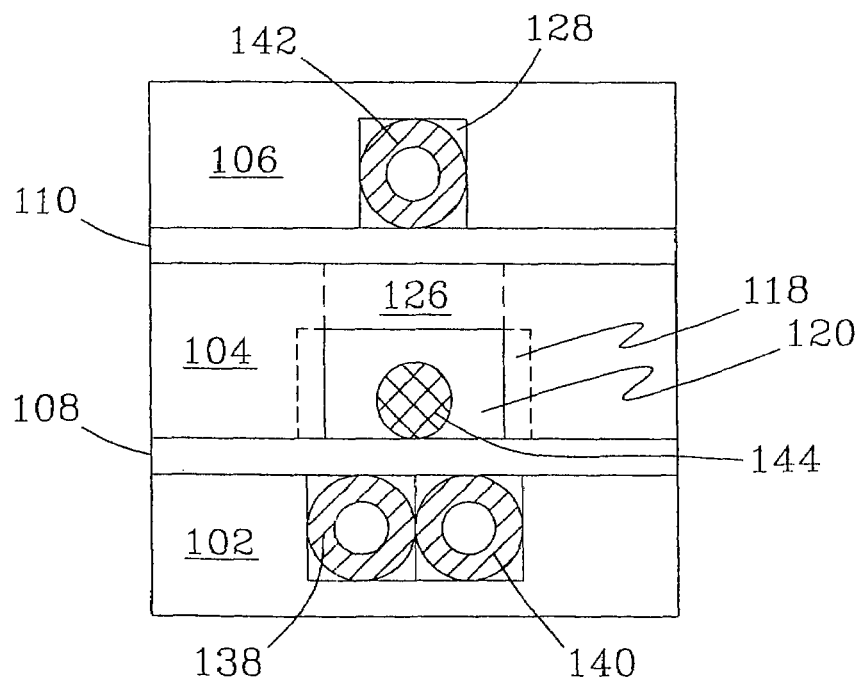
FIG. 2 is a cross-sectional front view of the microreformer of FIG. 1 along line A—A of FIG. 1.

A steam reformer of a first embodiment with a layer design is shown on FIGS. 1 and 2. The illustrated steam reformer comprises three substantially rectangular layers, namely, a fuel supply layer 102, a combustion layer 104, and a steam reforming layer 106, disposed one above the other. These layers are separated by first and second separation plates 108, 110, respectively. The layers and plate are described as disposed one above the other with reference to the figures, but the layers could be disposed in other geometric configurations, for example, they could be formed as sections disposed next to each other.

The fuel supply layer 102 comprises a fuel supply channel 112, which is formed as a substantially longitudinal groove 114 in an upper surface of the fuel supply layer. The groove has an open end on a side face of the steam reformer, while an opposite end 116 of the groove is closed laterally. The combustion layer comprises a cavity 118, which operates as a combustion chamber, and an exhaust channel 120, which is disposed substantially longitudinally, and is open on both the upper and the lower surface of the combustion and exhaust layer. The fuel supply channel and the exhaust channel operate as the combustion chamber inlet and outlet, respectively.

The combustion chamber is disposed above the laterally closed end of the fuel supply channel, and the first separation plate 108 has an opening 122 under the combustion chamber, so that the fuel supply channel and the combustion chamber are in fluid communication. In the embodiment shown, the fuel supply channel and the exhaust channel are disposed on the same lateral side of the combustion chamber, and they are preferably parallel to each other.

A combustion catalyst 124 is disposed in the combustion chamber. The combustion catalyst can fill the whole combustion chamber, or a space 126 can be provided between the combustion catalyst 124 and the second intermediary plate 110 as shown on FIG. 1 to allow for fluid expansion and flow to the exit chamber. Various types of catalysts which can be used as combustion catalysts are disclosed in detail below.

The steam reforming layer 106 comprises a reforming channel 128 which is disposed substantially longitudinally, and is open on the under face and opposite side faces of the steam reforming layer. Thus, a first portion of the reforming channel constitutes a reforming fuel supply channel 130, a second portion of the reforming channel constitutes a reforming chamber 132, and a third portion of the reforming channel constitutes a reformation products channel 134. The reforming fuel supply channel and the reformation products channel operate as the reforming chamber inlet and outlet, respectively.

The reforming chamber 132 is disposed substantially above the combustion chamber 118, and the reforming fuel supply channel 130 is disposed on a same lateral side of the combustion chamber as the exhaust channel 120, more precisely, the reforming fuel supply channel and the exhaust channel are preferably parallel to each other.

A reforming catalyst 136 is disposed in the reforming chamber. The reforming catalyst is also discussed in detail below.

The first and second separation plates are made of a heat conductive material, so that heat from the combustion exhaust in the combustion exhaust channel can be transferred, on the one hand, to the combustion fuel in the fuel supply channel, and on the other hand, to the reforming fuel in the steam reforming channel. Thus, the combustion fuel supply channel 112 and the exhaust channel 120 form a first heat exchanger, and the reforming fuel supply channel 130 and the exhaust channel 120 form a second heat exchanger. The first heat exchanger makes it possible to vaporize and/or preheat a combustion fuel mixture prior to its delivery into the combustion chamber, and the second heat exchanger makes it possible to vaporize and/or preheat a reformation fuel mixture prior to its delivery into the reforming chamber.

The catalyst 124 is surrounded by solid material except for a 7° side opening and a top opening to expansion chamber 126., Exhaust gases travel out of the 7° side opening into open exhaust channel 120.

The combustion fuel supply channel 112 is in fluid communication with a source of combustion fuel such as a hydrocarbon fuel, for example methanol, and a source of oxidant, for example oxygen in air. As shown on FIG. 2, a combustion fuel tube 138 and an air tube 140 are inserted into the combustion fuel supply channel. Similarly, the a, reforming fuel channel 130 is in fluid communication with a source of reforming fuel, in that a reforming fuel tube 142 is inserted into the reforming fuel channel. Evacuation of exhaust liquids, in particular liquid water, is facilitated in that a capillary tube or wick 144 is inserted into the exhaust channel. Exhaust can be expelled into the environment directly from the outlet of the exhaust channel 120, as shown on FIG. 1. In the alternative, the exhaust channel could be connected to an exhaust tube for evacuating exhaust at a location further away from the microreformer, or the exhaust channel could be in fluid communication with a collecting container so as not to release exhaust fluids into the environment. Means of removing liquids, or preventing the formation of liquids, in the outlet can provide significant advantages—especially in small devices where the formation of liquid droplets may cause "slugging" and poor device performance.

In another embodiment, a wick can be used to transport liquid into or out of a steam reformer.

Various materials or combinations of materials can be used in the microreformer of the present invention. For example, a metal or a ceramic, such as zirconium, is preferably used for the layers while a metal, such a stainless steel, aluminum, brass or copper, is preferably used for the intermediary plates. The materials are preferably resistant to steam or oxygen corrosion. As a variant, a plastic material, such as polyimide, is used for the layers only, or for both the layers and the separation plates. The fuel supply tubes can be plastic or metallic, for example, stainless steel. The wick is preferably a material such as fibers or foams that utilize capillary forces to transport liquids, such as cotton or felt; alternative means such as hydroscopic materials (e.g. silica) or materials with hydrophilic surface properties may also be employed as wicks.

Figure 3:
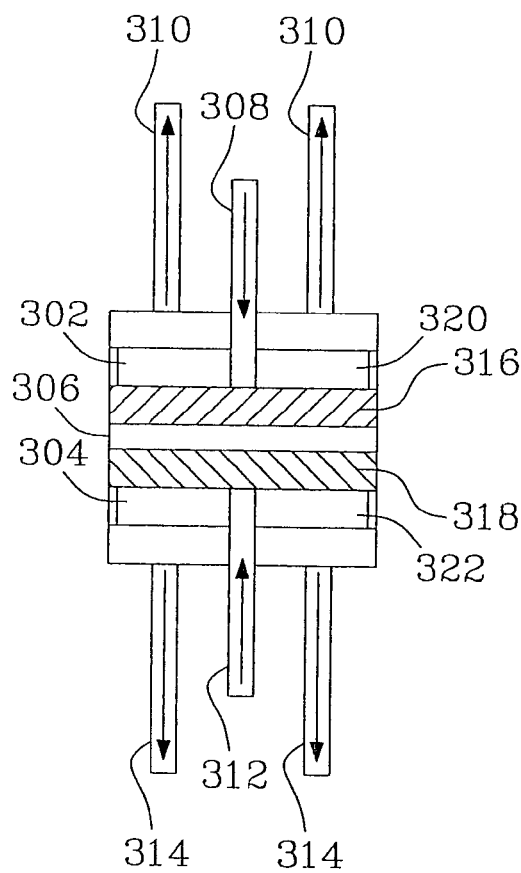
FIG. 3 is a cross-sectional front view of a microreformer in a second embodiment according to the present invention.

A microreformer of a second embodiment according to the present invention with a plunger design is shown on FIG. 3. In this embodiment, a combustion chamber 302 and a reforming chamber 304 are disposed opposite a transverse separation surface 306 along a main longitudinal axis of the microreformer. The separation surface 306 can be a separation plate. For example, the chambers are cylindrical, each chamber being formed by a rear wall and a peripheral wall centered on the main longitudinal axis, the chambers being closed by the separation plate.

Inlet and outlet, respectively 308, 310 are provided on the combustion chamber 302 from a side opposite the separation plate. Similarly, inlets and outlet, respectively 312, 314 are provided on the reforming chamber 304 from a side opposite the separation plate. Preferably, the inlet of at least one chamber being disposed in a central portion relative to the main longitudinal axis and the outlet being disposed in a peripheral portion relative to the main longitudinal axis. For example, the inlet and outlet channels are disposed substantially parallel to the main longitudinal axis, and tubes forming the combustion inlet channel and the reforming inlet channel are disposed along the main longitudinal axis while two tubes forming the combustion outlet channels and reforming outlet channels, respectively, are disposed in symmetrical positions relative to the respective inlet channel, as shown on FIG. 3.

A combustion catalyst 316 and a reforming catalyst 318 can be placed on opposite faces of the separation plate, for example, as coatings. Fuels can be supplied into the respective catalysts in that the inlet tubes open directly against or into the catalyst material. Heat is transferred from the combustion chamber to the reforming chamber through the separation plate.

The catalysts can fill the whole chambers, or a space can be provided in a portion of the respective chamber. For example, a space respectively 320, 322 in fluid communication with the outlet channels can be provided in a portion of one or both chambers opposite the separation plate so as to surround the inlet tube, as shown in FIG. 3. In that case, a transverse catalyst plate is preferably disposed in the respective chamber to separate the portion of the chamber which is filled with catalyst and the portion of the chamber without catalyst. An advantage of this variant is that outlet gases fill this portion of the chamber or chambers, so that heat can be transferred from the outlet fluids to the inlet fluids.

In the combustion chamber as well as in the reforming chamber, the fuel flows in more than one direction from the inlet to the outlet. In other words, the inlet and outlet are disposed such that more than one line can be traced from the center of an inlet to the center of an outlet across the chamber. In a preferred embodiment, fuel expands radially through a catalyst. In preferred embodiments, gas moves fast near the inlet and then slows as it moves through the catalyst. In some preferred embodiments, the gas is hottest at the center of the catalyst and near the inlet, thus providing precise delivery of thermal energy.

In another variant (not shown) of this embodiment, the two outlet tubes of at least one of the chambers are replaced by a single outlet tube surrounding the inlet tube.

Figure 4:
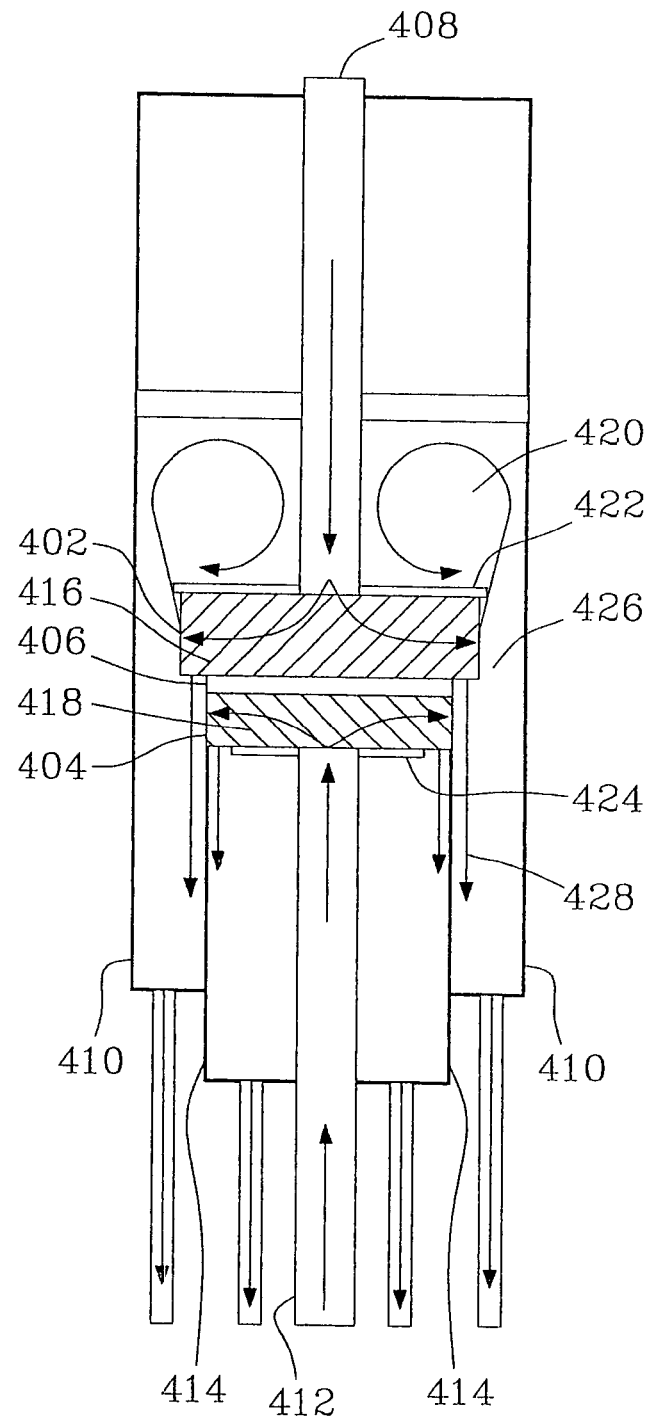
FIG. 4 is a cross-sectional front view of a microreformer in a third embodiment according to the present invention.

A microreformer of a third embodiment according to the present invention with a second plunger design is shown on FIG. 4. In this third embodiment, a combustion chamber 402 and a reforming chamber 404 are disposed on opposite sides of a transverse separation surface 406, for example a separation plate, along a main longitudinal axis of the microreformer. A centrally positioned inlet tube 408 parallel to the main longitudinal axis opens into the combustion chamber 402 through its rear face, i.e., the side opposed to the separation plate, as in the second embodiment. However, this embodiment differs from the second embodiment in particular in that an outlet channel 410 of the combustion chamber is on the side of the reforming chamber 404. More precisely, an inlet channel 412 of the reforming chamber is surrounded by an outlet channel 414 of the reforming chamber, which is formed as an annular channel. Further, the outlet channel 410 of the combustion chamber is also formed as an annular channel surrounding both the reforming chamber 404 and the outlet and inlet channels respectively 414, 412 of the reforming chamber. This construction makes it possible to transfer heat from the reforming outlet to the reforming inlet, also from the combustion outlet to the reforming chamber and both the reforming inlet and outlet.

Catalysts respectively 416, 418 are placed in the respective chambers, for example on or against the separation plate. Advantageously, the inlet in at least one chamber opens directly onto the catalyst.

In this third embodiment, the catalyst can fill the whole or only a portion of each chamber, as in the second embodiment. In the variant shown on FIG. 4, the catalyst fills the whole chamber, a rear exhaust chamber 420 in fluid communication with the combustion chamber and the exhaust channel is provided around the combustion inlet tube, so as to transfer heat from the combustion exhaust to the combustion fuel. A transverse catalyst plate 422 is disposed between the combustion chamber 402 and the rear exhaust chamber, and a transverse catalyst plate 424 is disposed between the reforming chamber 404 and its outlet 414. Annular area 426 is the exhaust channel and 428 is the exhaust flow.

Materials as described in reference with the first embodiment can be used for the second and third embodiment.

Fluid flow is directed such that the heat generated in the exothermic side of the reactor is used to optimize the transfer of heat to the endothermic side of the reactor via conductive heat transfer, and to preheat the fuel streams to achieve vaporization via convection.

Reactants are fed through an inlet formed as a central feed tube such that the vaporized feed contacts the respective catalysts at the centers of the catalyst disks. The fluid flows radially, in all directions, out from the center of the catalyst disk as a mixture of diminishing concentration of unreacted fuel to exhaust products. As the fluid mixture diffuses through the catalyst bed, unreacted fuel contacts unused catalyst reaction sites such that all of the fuel is reacted prior to entering the exhaust chamber.

By directing the flow in this manner a natural temperature gradient is established between the center and the outer edges of the catalyst bed. The highest temperature being at the center of the bed.

The heated exhaust gases enter the exhaust chamber at temperatures ranging from 80° C. to 400° C., but preferably above 100° C. High exhaust gas temperatures are indicative of unreacted fuel entering the exhaust chamber while low exhaust gas temperatures are indicative of a low fuel feed rate, or an unreactive catalyst bed.

Directing fluid flow in this manner serves to maximize the temperatures at the center of the thermally conductive transverse separator plate located between the two reactor chambers and minimizes heat loss through the reactor walls.

Figure 5:
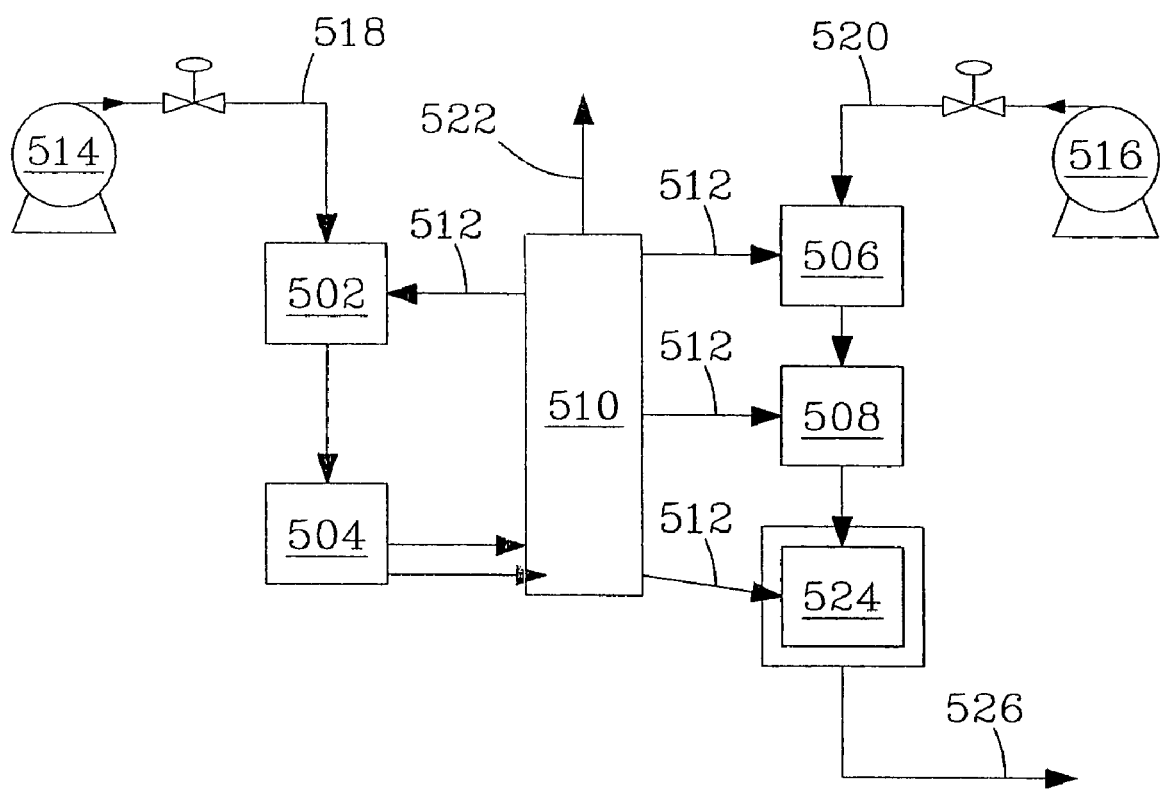
FIG. 5 is a schematic view of a steam reforming system according to the present invention.

The microreformer can be integrated into a fuel cell system as shown schematically on FIG. 5. The microreformer of the present invention is shown on FIG. 5 as a combustion fuel vaporizer/preheater 502, a combustor unit 504, a reforming fuel vaporizer/preheater 506, a reforming reactor 508, and a heat exchanger 510 which directs heat from the combustor unit to the combustion fuel vaporizer/preheater, the reforming fuel vaporizer/preheater and the reforming reactor, as shown by arrows 512 on FIG. 5. Each of the combustion and reforming fuel mixtures is provided through at least a pump and valve system respectively 514, 516 and a feed line respectively 518, 520. Exhaust is evacuated from the combustor through the heat exchanger 510 and line 522. Reforming fluids are treated in an optional gas clean-up unit 524 before being directed through line 526 toward a fuel cell (not shown) where reformation products (including $H_2$) are combined with $O_2$ to generate electricity. The secondary clean-up process may include a preferential oxidation reactor or a methanation reactor or both, membrane separation of either hydrogen or carbon monoxide, a sorption based separation system for either hydrogen or carbon monoxide, and the like.

In practice, fuel processing systems may be significantly more complex. Typically, heat from a combustor will be used to supply heat for other processes such as steam generation (not shown) that can be utilized for a steam reformer, autothermal reactor and water gas shift reactor. Various fuel cells are well-known and commercially available and need not be described here. Instead of fuel cell, the hydrogen-containing gas could, for example, go to: a storage tank, a refueling station, a hydrocracker, hydrotreater, or to additional hydrogen purifiers.

Operation of a microreformer according to the present invention will now be described.

Steam reforming is a process in which hydrogen is stripped from a hydrocarbon fuel by thermal energy provided by a combustor. The process can be represented by the chemical equation:

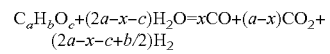

$$C_aH_bO_c + (2a-x-c)H_2O = xCO + (a-x)CO_2 + (2a-x-c+b/2)H_2$$

Heat should be provided to the reforming unit in order to vaporize or preheat the fuel and for the reforming reactions to occur. This heat is provided by the combustor which can burn a mixture of hydrocarbon fuel and hydrogen gas. Heat from the combustor exhaust is fed to heat exchangers in order to direct the heat to the areas needed, thus obtaining an efficient thermal integration of the combustor unit with the rest of the device, in particular the reforming unit.

The reformer reactor should contain a catalyst. Particularly useful are engineered catalysts having very high porosity, for example, at least about 80%, and large pore sizes, for example, up to 200 μm, so as to facilitate a high mass transfer at low pressure differential. Such catalyst is a preferred way to maintain a small-size reactor. A very high activity catalyst is not required, but high activity catalysts can be used, which can result in smaller devices with larger processing rates.

Engineered methanol steam reforming catalysts can be prepared using a wash-coating technique based on FeCrAlY felt (obtained from Technetics, Deland, Fla.) with 0.01" thickness and 90% porosity. Catalyst compositions suitable for methanol steam reforming include CuZnAl, Pd/ZnO, and supported Ru, Pt, and Rh catalysts. Pd/ZnO catalyst can be used advantageously.

Powdered catalysts can be prepared using impregnation method. Such catalyst can be prepared, for example, by impregnating $Pd(NO_3)_2$ solution (Engelhard, 20 wt % Pd) on ZnO oxide (Aldrich), with Pd loading of 20 wt %. The impregnated catalyst is then dried at a temperature of 100° C. for a period of 12 hours in air so as to spread the metal over the entire support. After drying, the catalyst is slowly heated in air at a rate of 2° C./min to a temperature in the range of 300 to 500° C. and held at the final temperature for 4 hours, which is sufficient to decompose the metal salts.

Catalyst coating slurry can be prepared by mixing powder catalyst with de-ionized water in the ratio of 1:6. The mixture is ball-milled for 24 hours to obtain coating slurry containing catalyst particles less than 1 micron. Before wash coating, metal felt is pretreated by a rapid heating to 900° C. in air for 2 hours. The heat-treated felt is wash-coated by dipping the felt into catalyst slurry. The wash coating process may be repeated to obtain desired weight gain. Between each coating, the felt coated with catalyst is dried in an oven at 100° C. for 1 hour. The coating procedure is repeated to achieve desired coating thickness or catalyst loading. After the final coating step, the catalyst is dried overnight in an oven at 100° C. and calcined by heating slowly in air at rate of 2° C./min to a temperature in the range of 300 to 500° C. The amount of catalyst coated may be in the order of 0.1 gram catalyst per square inch (6.5 $cm^2$) of felt. Prior to steam reforming testing, the engineered catalyst felt is advantageously subjected to an activation treatment, preferably reduction at 300–400° C.

The above procedure can be applied to other types of structured substrates like metal foams made of stainless steel, copper, alloys, etc for the preparation of engineered methanol steam reforming catalysts.

Engineered combustion catalyst can also be prepared based on FeCrAlY felt from Technetics. Similar to the preparation of engineered steam reforming catalysts, the FeCrAlY felt substrate is first fired at 900 C. for 2 h in a muffle furnace. After the firing process, the felt is cooled to room temperature. It is then dip-coated in a colloid $Al_2O_3$ solution (PQ corporation) containing micron sized gamma $Al_2O_3$ particles. This step is conducted by immersing the felt into the solution, then removing excess solution on the felt on an absorbent sheet, followed by drying under vacuum at 110C. for overnight. The sample is heated to 500C. for 3 h prior to the addition of Pd. The Pd is added by soaking the engineered substrate, now containing an $Al_2O_3$ layer into a 20 wt % $Pd(NO_3)_2$ solution (Engelhard). Upon removing excess $Pd(NO_3)_2$ solution, the sample is dried in vacuum at 110 C. for at least 4 h. Final calcination is conducted by heating at 2 C./min to 350 C., and holding isothermally at that temperature for 3 hrs. The preprared $Pd/Al_2O_3$ engineered catalyst has a nominal loading of 47 wt % Pd over $Al_2O_3$ and 0.126 g-cat/g of FeCrAlY.

Examples of catalysts are described in U.S. patent application Ser. No. 09/788,294, incorporated herein by reference.

The surface active sites are dispersed on a (preferably high surface area, BET surface area>10 $m^2/g$) metal oxide support. Preferred metal oxides include ZnO, $ZrO_2$, and $Al_2O_3$. The metal oxide, including the presence of catalytically active surface sites, as measured by BET, preferably has a volumetric average pore size of less than 0.1 micrometer (μm). The metal oxide, including the presence of catalytically active surface sites, as measured by BET, nitrogen physisorption, preferably has a surface area of more than 10 $m^2/g$, more preferably a surface area of 20 to 500 $m^2/g$. The metal oxide can be particles, preferably having diameters less than 100 μm, more preferably less than 10 μm, or, more preferably, forms a layer (of agglomerated particles or a continuous film) having a thickness less than 100 μm, more preferably less than 50 μm, and still more preferably a thickness of less than 10 μm.

The catalyst may, for example, take any conventional form such as a powder or pellet. In some preferred configurations, the catalyst includes an underlying large pore support. Examples of preferred large pore supports include commercially available metal foams and, more preferably, metal felts. The large pore support has a porosity of at least 5%, more preferably 30 to 99%, and still more preferably 70 to 98%. Preferably, the support has a volumetric average pore size, as measured by BET, of 0.1 μm or greater, more preferably between 1 and 500 μm. Preferred forms of porous supports are foams and felts and these are preferably made of a thermally stable and conductive material, preferably a metal such as stainless steel or FeCrAlY alloy. These porous supports are preferably thin, such as between 0.1 and 1 mm. Foams are continuous structures with continuous walls defining pores throughout the structure. Felts are fibers with interstitial spaces between fibers and includes tangled strands like steel wool. Various supports and support configurations are described in U.S. patent application Ser. No. 09/640,903 (filed Aug. 16, 2000), which is incorporated by reference.

The catalyst with a large pore support preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions.

In one preferred embodiment, the large-pore substrate has a corrugated shape that could be placed in a reaction chamber (preferably a small channel) of a steam reformer.

One preferred method of making a methanol catalyst is by impregnating a metal oxide with solutions containing Pd and/or Ru and Ce (if present) followed by drying, calcining, and reducing. Other methods could be used. For example, it is also anticipated that catalyst with the aforementioned preferred compositions can be prepared by a co-precipitation method using inorganic or organometallic precursors.

When an underlying, large-pore substrate is used, the powder can be slurry coated over the substrate at any stage in the preparative process. For example, a high surface area metal oxide could be slurry coated onto the substrate followed by depositing, drying and activating a metal via the impregnation method. Alternatively, a vapor coat or soluble form of alumina (or other high surface area material) could be applied onto the substrate. Although solution or slurry coating is typically less expensive, vapor coating of the various materials could also be employed.

An advantage of catalysts as described above is that flows of combustion and reforming fuels can be maintained such that the combustion and reforming operation can be performed at lowered temperature. Preferably, the temperature difference between the combustion chamber and the reforming chamber is at most about 100° C. Thus, the combustion operation is preferably performed at a temperature of at most about 425° C. and the reforming operation is preferably performed at a temperature of at most about 325° C.

In the illustrated devices, the catalysts are porous, flow-through catalysts in which flow proceeds chiefly through the catalyst structure. In some alternative embodiments, the catalyst can be placed on an inner wall or on inner walls of the reaction chamber with an open channel from the reactor inlet to the outlet—this configuration is called "flow-by." In other alternative embodiments, the catalyst can be packed in the flow path.

In addition to, or in place of, the preheat chambers, heat exchangers can be employed to control temperatures of fluids and components in the devices. The direction of flow in the heat exchangers may be either co-current, counter-current, or cross-flow. This approach can enable excellent heat transfer performance. The invention also enables the economical manufacture of arrays of microcomponent devices incorporating hundreds or thousands or more of microcombustors (Optionally interleaved or nested with alternating components such as microreformers or heat exchangers).

Various components for these microcombustors and microreformers can be manufactured using standard techniques for producing small metal, ceramic, and/or plastic parts. For example, the body and plungers for the combined reactor assembly can be stamped from a standard metal press fitted with the appropriated dies, and the end-cap assemblies can be extruded as completely assembled units. Assembly joins the end-cap assemblies to the catalyst filled body and plungers via standard parts joining processes, which may employ the use of adhesive bonds or metals soldering techniques.

The reformate stream usually comprises hydrogen, carbon dioxide, and carbon monoxide. PEM fuel cells operate best on pure hydrogen. They can generally tolerate carbon dioxide and some other gases such as nitrogen, but only up to a certain amount. Thus, clean-up of the reformate stream is performed, for example by a multi-step process consisting of water gas shift reactors, combined with selective oxidation and/or carbon monoxide methanation, or by the use of a hydrogen permeable membrane, as disclosed in Pietrogrande et al., "fuel processing," *Fuel Cell Systems*, Chap. 4, Blomen, L J M J and M N Mugerwa, pp. 121–151, Plenum Press, New York, 1993.

Further, many fuel cells can only tolerate a limited amount of carbon monoxide, for example up to 10 to 20 ppm. However, fuel cells which can tolerate up to 5 vol. % carbon monoxide in their hydrogen feed stream do not require carbon monoxide clean-up of the reformate stream. A complete compact power system can be constructed with liquid and gas delivery systems, valves, microbattery for start-up, packaging and integration with a fuel cell. For example, passive liquid delivery systems (0.03 ml/hr–0.2 ml/hr), gas delivery systems (5 sccm–20 sccm) valves, and appropriate controls can be provided. The system can also be operated passively, from a start-up time or after an initial expenditure of energy to begin the process.

The steam reforming reaction can be run over a broad pressure range from sub-ambient to very high. The alcohol steam reforming reaction is preferably carried out at 200–500° C., more preferably 240–400° C. In some preferred configurations, the combustion temperature is approximately the same (that is, within 20° C.) as the reformer temperature. The fuel (preferably methanol) and air flow rates to the combustor are preferably 0.01 to 5 ml/hr and 1–50 sccm, respectively and more preferably 0.1 to 0.5 ml/hr and 5–15 sccm respectively. The pressures are preferably between 0 and 10 psig and more preferably between 0 and 2 psig for both the combustor and the reformer. The reformer mixture molar ratios are preferably between 1–6 steam:carbon, and more preferably between 1.5–3 steam:carbon. The steam reformer fuel mixture flow rates are preferably between 0.005 and 1.0 ml/hr and more preferably between 0.05 and 0.1 ml/hr. The product stream preferably contains at least 30 sccm $H_2$ per cc of steam reformer volume, more preferably at least 200 sccm $H_2$ per cc of steam reformer volume, in some preferred embodiments between 100 and 5000 sccm $H_2$ per cc of steam reformer volume, and in some embodiments between 100 and 500 sccm $H_2$ per cc of steam reformer volume. Alternatively, the product stream preferably contains at least 1 sccm $H_2$ per cc of device volume, more preferably at least 5 sccm $H_2$ per cc of device volume, and in some preferred embodiments between 4 and about 15 sccm $H_2$ per cc of device volume.

An exemplary start-up procedure begins at room temperature with slow flow of $H_2$ gas (0.2–0.5 sccm) and low flow of air 5–8 sccm. After light-off, hydrogen flow is increased until reactor temperature is >70° C. (usually around 1–1.5 sccm $H_2$). Fuel flow to combustor can be initiated at this point. Once the fuel (preferably methanol) has begun reacting (the combustor temperature will increase substantially), the hydrogen flow is tapered off and the fuel flow is increased. A minimum of 10% excess air was maintained to ensure that the combustion catalyst was able to convert 100% of the fuel. The excess air should not be too much (preferably below 200%), since the extra air removes heat from the steam reformer. Air and methanol flows are adjusted until the steam reformer is at the desired temperature or 10–20° C. greater. The reformer fuel mixture flow is initiated at this point. Combustor flows are adjusted as necessary to maintain desired temperatures.

Preferred embodiments of the inventive microreformers and methods may also be described in terms of the exceptionally high specific activity of the catalysts. Preferably, the catalyst and/or method has a specific activity of greater than 1.5, more preferably greater than 2.5 mol methanol converted/(g catalyst)(hr) when tested at 400° C., 25 msec contact time, 1.8 steam-to-carbon (i.e., water:methanol) ratio; and the catalyst exhibiting this specific activity preferably has a pressure drop of less than 25 psig.

A significant advantage of the present invention is the ability to provide microcombustors and microreformers, possessing desirable performance capability, in sizes that have been heretofore unobtainable. Surprisingly, in methods and devices of the present invention, these small sizes can be accompanied by self-sustaining or better performance. The various combinations of size, flow rates, performance, and other variables discussed herein are preferred characteristics that can be used to describe the present invention.

Alcohol conversion is preferably at least 50%, more preferably at least 80% and still more preferably at least 90%. We have achieved greater than 99% conversion with thermal efficiencies (as defined below) of about 10%. Hydrogen selectivity, defined as moles H atoms in $H_2$ in the product gas divided by moles H in all product gases, is preferably at least 50%, more preferably at least 60%, still more preferably at least 85%. A conversion higher than 99% and close to 100% for fuels to both the combustor and for the reformer has been attained.

In the combustion chamber conversion (as measured by gas chromatography of the exhaust gas) is preferably at least 70%, more preferably at least 80%, and still more preferably at least 90% and still more preferably at least 95%. Carbon dioxide selectivity, defined as moles $CO_2$ in the exhaust gas divided by of all carbon-and-oxygen-containing product gases, is preferably at least 50%, more preferably at least 70%, still more preferably at least 85%. Thermal efficiency is preferably at least 5%, more preferably at least 7% and still more preferably at least about 9%, and in some embodiments 5 to 25%, in some embodiments 5 to 20% and in some embodiments 7 to about 10%.

The combustion chamber preferably has a volume of 0.05 ml or less; more preferably 0.003 ml or less. In some preferred embodiments, the volume of the combustion chamber is in the range of 0.02 and 0.002 ml. A reforming chamber in thermal contact with the combustion chamber preferably has dimensions that are similar to, or the same as, the dimensions of the combustion chamber.

The overall volume of a microreformer device (including preheat, combustion and reforming chambers) is preferably less than 0.5 ml, more preferably 0.05 ml or less. In some preferred embodiments, the volume of the microreformer is in the range of 0.005 and 0.1 ml.

In cylindrical configurations (such as shown in FIGS. 3 and 4), the combustion and reforming chambers preferably have a diameter of 35 mm or less, more preferably 15 mm or less; and in some preferred embodiments, the diameter is in the range of 0.74 to 5.0 mm. In layered configurations (such as shown in FIGS. 1 and 2), the combustion layer preferably has a height (in the embodiment shown in FIGS. 1 and 2, height is the distance between the reformer layer and the combustor fuel layer including one half of the thickness of the two separator plates) of 1 mm or less, more preferably 0.6 mm or less; and in some preferred embodiments, the thickness is in the range of 0.4 to 0.1 mm.

EXAMPLE

An integrated fuel processor system composed of two vaporizers/preheaters, a reformer, catalytic combustor, and heat exchanger was built and tested. For each of these designs the manufacture and assembly were performed in the same fashion. Metal pieces were cut and machined from standard stainless steel stock. Ceramic pieces were formed and machined using standard ceramics molding and shaping techniques. Tubing and fittings were cut to fit as required.

The following example is for a device such as illustrated in FIG. 3. For preassembly, all of the tubing, catalyst pieces, and respective reactor parts were cut per specifications. Plungers were joined to tubing using standard, high-temperature adhesives. In the alternative, high-temperature soldering could be used for some or all joins. All tubing and the plunger assemblies were inserted through the end-caps or end-seals and set to their appropriate positions for final assembly.

The first step in the assembly process was to insert the catalyst pieces into their respective chambers, and then attach the end-caps or seals such that the plunger bodies were pressed tightly against their respective catalysts. In the second step, the end-caps were then attached permanently to the reactor body by applying high-temperature adhesive or by high-temperature soldering.

Catalytic combustion was used to provide heat for liquid vaporization, gas preheating, and to provide the necessary energy for the reforming reaction or reactions. The reformer had a volume of 2.5 $mm^3$ and a capacity of 200 $mW_t$. The combustor volume was 2.5 $mm^3$ and had a capacity of up to 3 $W_t$. The combustor capacity was oversized in order to allow a wide range of operating conditions to be examined. The combustor fuel consisted of hydrogen and methanol. A thermal couple was inserted into the combustor to monitor the device temperature. The system was mounted inside a larger tube for testing.

The test stand consisted of syringe pumps, gas controllers, vapor liquid separations units, and an online gas chromatograph. Syringe pumps fed the methanol/water mixture to the reformer at rates of 0.02 cc/hr to 0.1 cc/hr (20° C. basis), and pure methanol to the combustor at rates between 0.1 cc/hr to 0.4 cc/hr (20° C. basis). Air was fed to the combustor at rates between 8 and 20 sccm. The product reformate gases were fed, via a dri-rite tube to eliminate any residual water vapor, to an on-line micro gas chromatograph (Agilent QuadH).

The use of electric heating for system start-up was eliminated by following the subsequent procedure. Hydrogen and air were fed to combustor to initiate combustion and heat the vaporizers. Once the vaporizers were heated to approximately 80° C., methanol was fed to the vaporizer. The hydrogen was slowly tapered off as the methanol feed was increased until only methanol and air were being fed to the combustor and the device was completely self-sustaining. The methanol/air mixture was adjusted until the steam reformer reached the desired temperatures (250° C.–450° C.) depending on the conditions being tested. The methanol/water solution feed was then initiated.

The reformer was operated over a wide range of conditions. In order to achieve 90% conversion, 425° C. operating temperatures in the combustor were required. Two hundred $mW_t$ power was achieved with a thermal efficiency of 10%. A 1/10,000 inch (2.5 µm) diameter thermocouple that was used to measure temperature was a major source of heat loss through the thermocouple. The efficiency could be substantially improved by removing the thermocouple and by use of improved insulator materials such as metallized polyimide (that reflects heat), and it is believed that with these improvements the inventive devices can be 25% thermally efficient.

With a catalyst composed of Pd on ZnO, the reformate stream was composed primarily of hydrogen (>73%), with approximately 26% carbon dioxide and 1% carbon monoxide constituting the rest of the components.

The thermal efficiency was calculated by dividing the lower heating value of the hydrogen in the reformate stream by the total heating value of the methanol fed the reformer plus the heating value of the fuel fed to the combustor as follows:

$$\text{Efficiency} = \Delta H_c \text{hydrogen}/(\Delta H_c \text{methanol reformer feed} + \Delta H_c \text{methanol combustor feed})$$

where $\Delta H_c$ is the lower heat of combustion of hydrogen or methanol as indicated. This is the equation used to calculate efficiency. $\Delta H_c$ of the feed will vary depending on the type of feed and conditions and the values can be found in standard tables such as Perry's Chemical Engineers Handbook.

The anticipated electrical power from a fuel cell powered by this stream can be found by multiplying the thermal power by the net fuel cell efficiency. Typical fuel cells operate at 60% efficiency and utilize 80–85% of the $H_2$ in a reformate stream for a net efficiency of about 50%. Thus, a fuel cell utilizing the reformate from this device could provide on the order of 100 $mW_e$ and the system (reformer+fuel cell) would have a net (fuel processor+fuel cell) efficiency of about 4.5%. As the reformer output was decreased, the efficiency also decreased. For example when the reformer produced 70 $mW_t$ (about 35 $mW_e$) the efficiency decreased to 3% (about 1.5% net). This decreased efficiency decreased because the thermal losses as a percent of the total amount of power fed to the device increases as the size is reduced.

The data in the following table was acquired using experimental procedure followed was mentioned above. The gas composition was determined using the Agilent Micro-Quad GC, the gas flow rates were determined using a bubble meter (measure the time it takes for a bubble to move through known volume which in this case was 0.2 cc). The gas flow rate was determined when ambient temperature was 19.5° C., thus to standardize it (gas flow at 0° C.), the flow rate was divided by 292.5 K (19.5° C.) and multiplied by 273 K (0° C.). This results are in sccm or standard cubic centimeters per minute. The methanol conversion was calculated by using a carbon balance on the system (e.g., the amount of carbon fed to the reformer is known, and the amount of carbon in the gas can be calculated from the amount of CO, $CO_2$, and methane formed. the two numbers gives the methanol conversion). The data has about a 5% standard deviation.

CLOSURE

While preferred embodiments of the present invention have been shown and described, it will be apparent to those skilled in the art that many changes and modifications may be made without departing from the invention in its broader aspects. For example, although devices are shown with one combustor and one reformer, numerous variations such as two combustors sandwiching one reformer, and these variations are included within the scope of the invention. The appended claims are therefore intended to include all such changes and modifications as fall within the true spirit and scope of the invention.

We claim:

1. A microcombustor comprising:
   a first section comprising a combustion fuel channel having an inlet for connecting the microcombustor to a combustion fuel source and an outlet at a top surface of said first section; and
   a second section disposed next to the first section;
   the second section comprising:
   a combustion chamber having an inlet in fluid communication with the outlet of the channel of the first section and an outlet capable of evacuating combustion exhaust products; and
   an exhaust channel having an inlet in fluid communication with the outlet of the combustion chamber and an outlet at a surface of said second section;
   wherein the combustion fuel channel and the exhaust channel are disposed on a same side with respect to the combustion chamber, so as to form a first heat exchanger;
   wherein the first section and the second section are separated by a first plate;
   and further comprising a second plate disposed on the side of the second section opposite the first section; wherein the second plate defines one side of the combustion chamber;

| Cntct Time mSec | Approx SR Temp, ° C. | Exit Flow ccm | Methanol Conversn | $H_2$ flow sccm | $H_2$/SR rctr vol scc/(min*cc) | $H_2$/device vol scc/(min*cc) | Thermal Pwr mW | Effncy % |
|---|---|---|---|---|---|---|---|---|
| 133 | 398 | 0.714 | 1.047 | 0.45 | 206 | 4.49 | 80.7 | 6.5 |
| 133 | 398 | 0.698 | 0.999 | 0.43 | 197 | 4.28 | 76.9 | 6.2 |
| 86 | 419 | 1.092 | 1.021 | 0.69 | 318 | 6.91 | 124.3 | 8.4 |
| 50 | 421 | 1.202 | 0.628 | 0.75 | 346 | 7.53 | 135.5 | 8.5 |
| 50 | 450 | 1.604 | 0.857 | 1.02 | 468 | 10.17 | 182.9 | 9.8 |
| 50 | 450 | 1.493 | 0.796 | 0.94 | 434 | 9.44 | 169.8 | 9.1 |
| 50 | 470 | 1.644 | 0.888 | 1.05 | 483 | 10.52 | 189.1 | 9.5 |
| 50 | 470 | 1.671 | 0.903 | 1.07 | 491 | 10.69 | 192.2 | 9.7 |
| 50 | 470 | 1.671 | 0.901 | 1.07 | 491 | 10.68 | 192.0 | 9.7 |
| 112 | 362 | 0.802 | 0.766 | 0.33 | 153 | 3.33 | 59.8 | 5.0 |
| 112 | 363 | 0.893 | 0.880 | 0.39 | 180 | 3.92 | 70.5 | 5.9 |
| 112 | 361 | 0.875 | 0.923 | 0.39 | 181 | 3.94 | 70.9 | 5.9 |
| 133 | 369 | 0.677 | 0.938 | 0.34 | 158 | 3.43 | 61.7 | 5.5 |
| 133 | 370 | 0.711 | 0.958 | 0.33 | 150 | 3.26 | 58.6 | 5.2 |
| 133 | 370 | 0.656 | 0.890 | 0.28 | 129 | 2.81 | 50.4 | 4.5 |
| 86 | 371 | 0.896 | 0.752 | 0.40 | 182 | 3.95 | 71.1 | 6.0 |
| 86 | 372 | 0.951 | 0.792 | 0.38 | 174 | 3.78 | 67.9 | 5.8 |
| 86 | 372 | 0.929 | 0.771 | 0.34 | 156 | 3.40 | 61.1 | 5.2 |
| 86 | 400 | 0.798 | 0.698 | 0.28 | 129 | 2.80 | 50.3 | 3.9 |

Efficiency of the system can be improved by feeding the unreacted hydrogen from the fuel cell back to the combustor. For example, if this were done in the device of Example 1, the resultant efficiency would be 4.59%, i.e., an increase in efficiency of 0.09% wherein the combustion chamber comprises a combustion catalyst and a space separates the combustion catalyst and the second plate;
wherein the space allows for fluid expansion and flow to the exhaust channel.

2. The microcombustor of claim 1, wherein the combustion fuel channel and the exhaust channel are disposed in planes substantially parallel to each other.

3. The microcombustor of claim 2, wherein the combustion fuel channel and the exhaust channel are adjacent and substantially parallel to each other.

4. The microcombustor of claim 1, wherein a first heat transfer layer is disposed between the first section and the second section.

5. The microcombustor of claim 4, wherein a second heat transfer layer is disposed on the second section.

6. The microcombustor of claim 1, wherein the combustion chamber has a volume in the range of 0.02 and 0.002 ml.

7. The microcombustor of claim 1, wherein a liquid evacuation system is disposed in the exhaust channel.

8. The microcombustor of claim 7, wherein the liquid evacuation system comprises a wick.

9. A fuel cell comprising the microcombustor of claim 1.

10. A steam reformer, comprising
a microcombustor as defined in claim 1; and
a third section comprising a reformation channel having an inlet for supplying reformation fuel and an outlet for evacuating reformation products,
wherein the exhaust channel and at least a portion of the reformation channel are disposed on a same side with respect to the combustion chamber, so as to form a second heat exchanger.

11. The steam reformer of claim 10, wherein the exhaust channel and the reformation channel are disposed in planes substantially parallel to each other.

12. The steam reformer of claim 11, wherein the exhaust channel and the reformation channel are adjacent and substantially parallel to each other; and wherein the reformation channel comprises a reforming catalyst.

13. The steam reformer of claim 10, wherein a second heat transfer layer is disposed between the second and third layers.

14. The steam reformer of claim 10, wherein a reformation catalyst is disposed in the reformation channel.

15. The steam reformer of claim 10, wherein a liquid evacuation system is disposed in the exhaust channel.

16. The steam reformer of claim 15, wherein the liquid evacuation system comprises a wick.

17. A fuel cell comprising the steam reformer of claim 10.

18. The microcombustor of claim 3 wherein the first section comprises a combustion fuel tube and an air tube.

19. The microcombustor of claim 3 wherein the combustion catalyst has a porosity of 30 to 95%.

20. The microcombustor of claim 3 wherein the combustion catalyst comprises a metal foam or a metal felt.

21. The microcombustor of claim 3 wherein the combustion catalyst has a thickness between 0.1 and 1 mm.

22. The microcombustor of claim 3, wherein a liquid evacuation system is disposed in the exhaust channel.

23. The microcombustor of claim 22, wherein the liquid evacuation system comprises a wick.

24. A fuel cell comprising the microcombustor of claim 23.

25. The microcombustor of claim 3, wherein the combustion catalyst has a pore volume of 5 to 98%.

26. The microcombustor of claim 22, wherein the combustion catalyst has a pore volume of 30 to 95% and at least 50% of the of the catalyst's pore volume is composed of pores in the size range of 0.1 to 300 μm.

27. The microcombustor of claim 3, wherein at least 50% of the of the combustion catalyst's pore volume is composed of pores in the size range of 0.1 to 300 μm.

28. The microcombustor of claim 3, wherein at least 20% of the of the combustion catalyst's pore volume is composed of pores in the size range of 1 to 100 μm.

29. The microcombustor of claim 3, wherein the combustion chamber has a volume of 0.05 ml or less.

30. The microcombustor of claim 1, wherein the combustion chamber has a volume of 0.05 ml or less.

31. The microcombustor of claim 23, wherein the wick comprises fibers or foam.

32. The microcombustor of claim 26, wherein the combustion chamber has a volume of 0.05 ml or less.

33. The microcombustor of claim 28, wherein the combustion chamber has a volume of 0.05 ml or less.

34. The microcombustor of claim 3, wherein the combustion chamber has a volume in the range of 0.02 and 0.002 ml.

35. The microcombustor of claim 23, wherein the combustion chamber has a volume in the range of 0.02 and 0.002 ml.

36. The microcombustor of claim 12 wherein the catalyst in the reformation channel is selected from the group consisting of CuZnAl, Pd/ZnO, and supported Ru, Pt, and Rh catalysts.

37. The microcombustor of claim 12 wherein the catalyst in the reformation channel comprises Pd/ZnO.

38. The microcombustor of claim 12 wherein the catalyst in the reformation channel comprises a metal foam.

39. The microcombustor of claim 12 wherein the catalyst in the reformation channel has a porosity of at least 80%.

40. The microcombustor of claim 39 wherein the catalyst in the reformation channel comprises Pd.

41. The microcombustor of claim 12 wherein the catalyst in the reformation channel is disposed in a reforming chamber that is in thermal contact with the combustion chamber and wherein the reforming chamber has a volume of 0.05 ml or less.

42. The steam reformer of claim 12 wherein the catalyst in the reformation channel has a pore volume of 5 to 98% and at least 20% of the of the catalyst's pore volume is composed of pores in the size range of 0.1 to 300 μm.

43. The steam reformer of claim 12 wherein the catalyst in the reformation channel has a specific activity of greater than 1.5 mol methanol converted/(g catalyst)(hour) when tested at 400° C., 25 millisecond contact time, and a reactant stream of 1:8 water:methanol ratio.

44. The steam reformer of claim 43 wherein the catalyst exhibits a pressure drop of less than 25 psig.

45. The steam reformer of claim 12 wherein the catalyst in the reformation channel has a specific activity of greater than 2.5 mol methanol converted/(g catalyst)(hour) when tested at 400° C., 25 millisecond contact time, and a reactant stream of 1:8 water:methanol ratio.

46. The steam reformer of claim 12 having an overall volume of less than 0.5 ml.

47. The steam reformer of claim 42 wherein the combustion catalyst has a pore volume of 5 to 98% and at least 20% of the of the catalyst's pore volume is composed of pores in the size range of 0.1 to 300 μm.

* * * * *